G. W. COLLIN.
REGULATING VALVE.
APPLICATION FILED NOV. 18, 1908.

1,001,620.

Patented Aug. 29, 1911.
2 SHEETS—SHEET 1.

WITNESSES

INVENTOR
George W. Collin
BY
Chamberlain & Newman
ATTORNEYS

G. W. COLLIN.
REGULATING VALVE.
APPLICATION FILED NOV. 18, 1908.
1,001,620.
Patented Aug. 29, 1911.
2 SHEETS—SHEET 2.
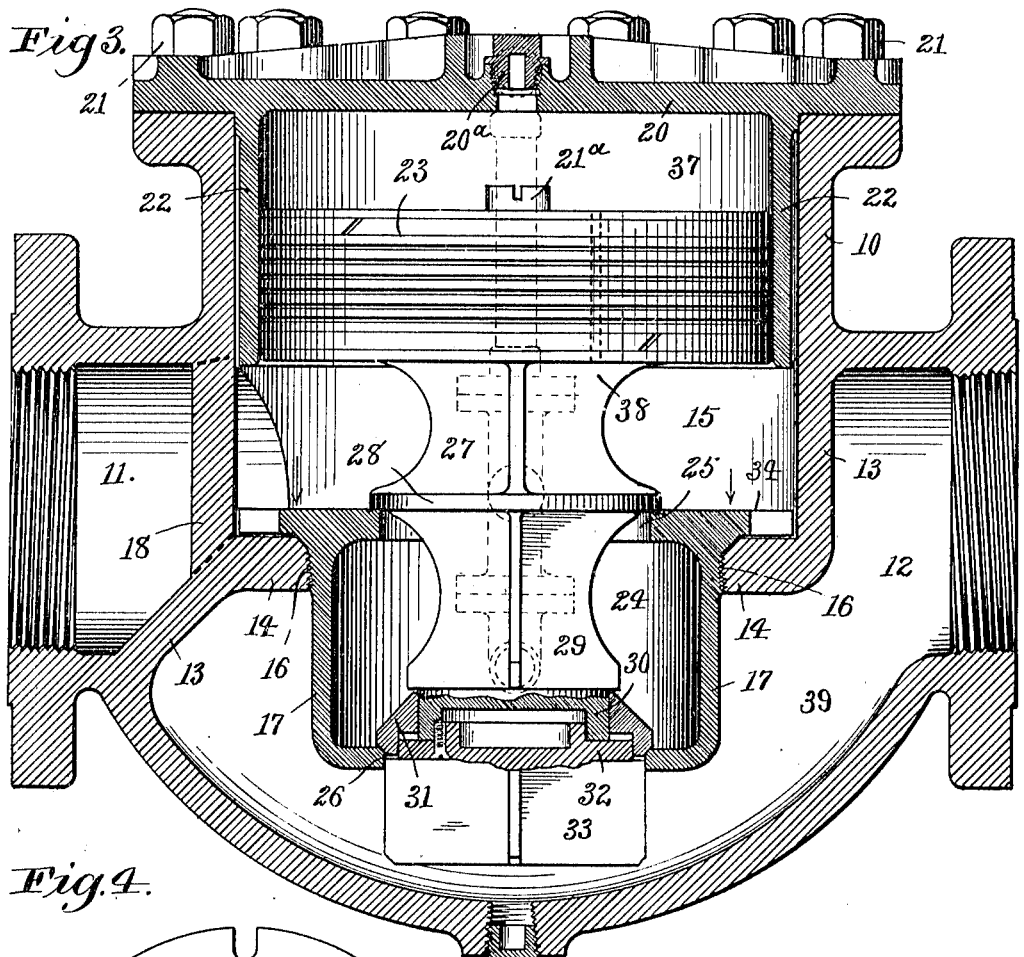
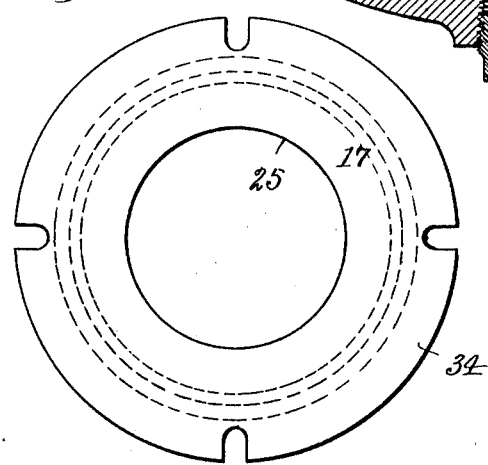
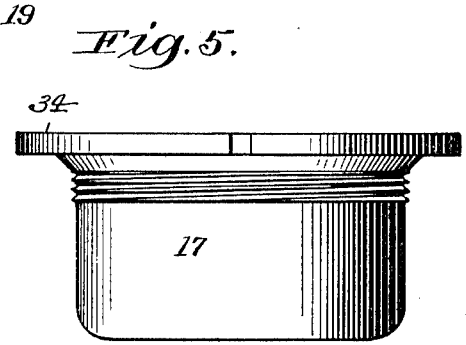
WITNESSES
INVENTOR
George W. Collin
BY
Chamberlain & Newman
ATTORNEYS

UNITED STATES PATENT OFFICE.

GEORGE W. COLLIN, OF BRIDGEPORT, CONNECTICUT, ASSIGNOR TO THE COLLIN VALVE COMPANY, OF BRIDGEPORT, CONNECTICUT, A CORPORATION OF MAINE.

REGULATING-VALVE.

1,001,620.      Specification of Letters Patent.      Patented Aug. 29, 1911.

Application filed November 18, 1908. Serial No. 463,242.

*To all whom it may concern:*

Be it known that I, GEORGE W. COLLIN, a citizen of the United States, and resident of Bridgeport, in the county of Fairfield and State of Connecticut, have invented certain new and useful Improvements in Regulating-Valves, of which the following is a specification.

My invention relates to new and useful improvements in steam pressure regulating valves, and especially to brass or bronzed lined types of regulator valves, which are usually produced in cast iron or steel, for the larger sizes and with a view of obtaining the results and advantages of an all brass valve.

The valve is connected somewhat along the general lines of the previous types of pressure regulator valve patented by me October twenty-fourth, nineteen hundred and five, #802,496, and now being commercially manufactured, and includes in part a combined piston and double valve, which are operated by the main steam pressure through the medium of a diaphragm and controlling valve, whereby a uniform but reduced pressure of steam may be maintained in the service line, though supplied from a boiler or other source of greater and varying pressure. The main body which is the heavier portion of the valve is formed of cast iron or steel in a way to require very little machine work, and so as to readily receive the brass linings which I employ for contact with all movable parts, as for instance the piston and valves before mentioned, thus insuring an equal expansion of metal of valves and linings thus producing a practical design for the large type of valve which will have all the advantages of an all brass valve, but which my be produced at a much smaller cost.

Figure 1:
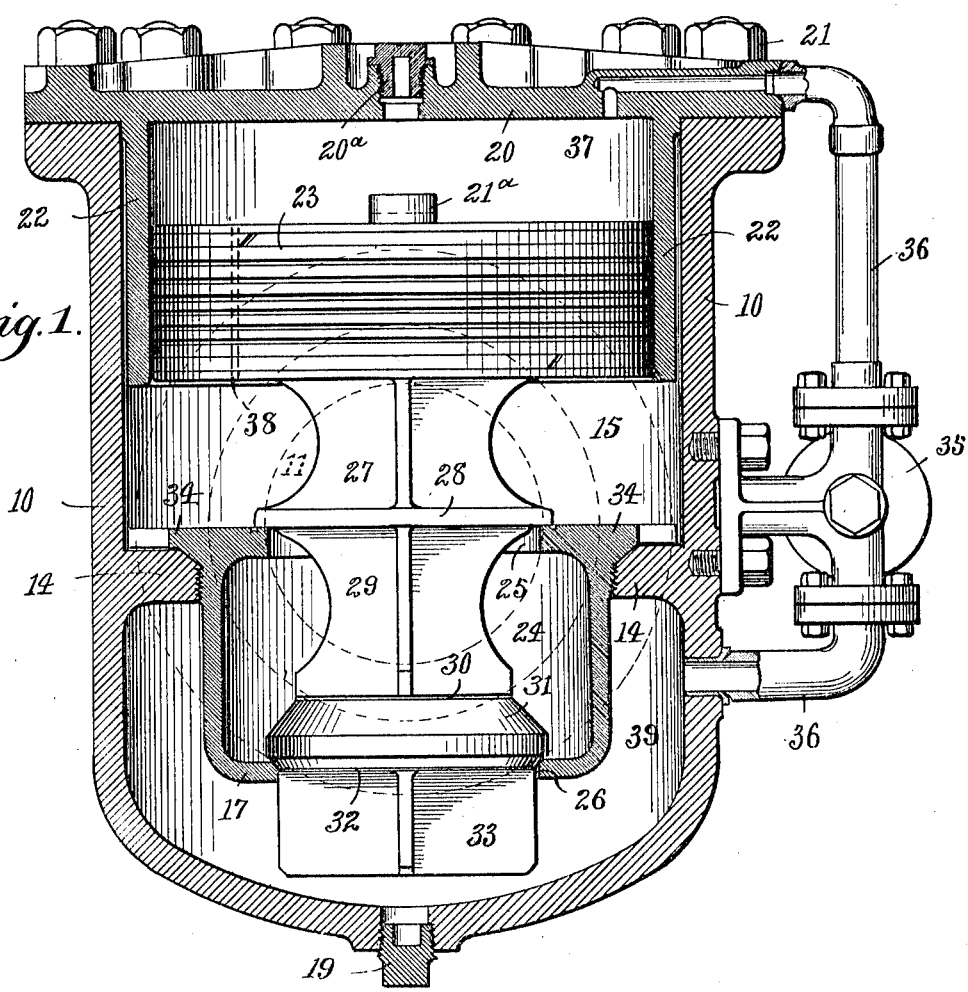
Figure 2:
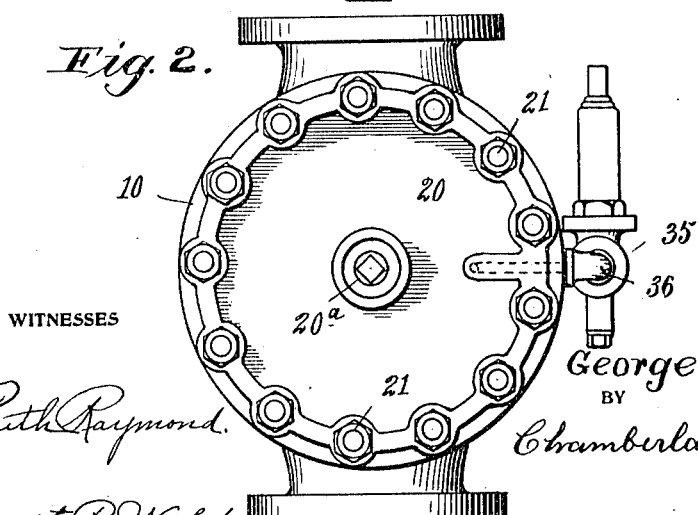

Referring to the accompanying two sheets of drawings forming a part of this specification and upon which similar characters of reference are used to designate like parts, it will be seen that, Figure 1, shows a central vertical cross section through my improved brass lined reducing valve complete. Fig. 2, is a plan view of the same valve on a reduced scale. Fig. 3, is a central vertical longitudinal section through the said reducing valve. Fig. 4, is a detached plan view of the lower lining forming the two valve seats, shown in the sectional Figs. 1 and 3, and Fig. 5, is a detached side elevation of the said lower lining just referred to.

Referring in detail to the reference characters marked upon the drawings 10 indicates the main body of the valve which is formed of cast iron or cast steel, having an inlet 11 and an outlet 12. The said inlet and outlet being separated by a wall 13 of which the horizontal portion 14 forms a bottom for the live steam chamber 15. This bottom is provided with a round hole 16 therethrough which is threaded as shown to receive the brass liner 17 which is screwed therein for permanent attachment.

18 is a vertical rib or splinter that is located central of the steam intake to divide the steam equally as it enters the piston chamber and to insure an equal pressure upon all sides of the valve and stem.

The bottom portion of the casing is provided with a removable plug 19 by means of which the valve may be drained should occasion require.

The top of the valve body is inclosed with a brass cover 20 attached by stud bolts 21, and has a depending annular flange 22 forming a liner which snugly fits down into the bore of the cylinder just far enough to hold the liner central and in line with the valve ports. Below this engagement the liner is of a reduced and uniform thickness and spaced from the body so as to admit the steam against the outside as well as the inside, thereby being exposed to the steam equally at all points and thus getting an equal expansion of the liner and holding it around where it contacts with the inclosed movable parts thus insuring a perfect operation. This flange like the said upper portion 15 of the body is of a cylindrical form and its inner surface is finished to receive the piston 23 which is movably mounted therein. The cover is further provided with a removable plug 20ª by means of which access may be had to the slotted head 21ª on piston for turning the same and valves. The liner 17 while shown threaded to engage the hole 16 in the bottom 14 may if preferred be driven in instead, and besides forming a steam cushion chamber 24 contains a valve seat adjacent to both the upper and lower ports 25 and 26 respectively, while its flange 34 is shown slotted to receive a spanner wrench whereby it may be secured in place.

Upon the underside of the piston 23 are formed wings 27 which carry a flat seating type of valve 28 to cover the upper port 25, and beneath it again are similar wings 29 bearing an annular hub 30 upon their lower end portions to which the valve 31 is slidably attached by means of the cap 32 screwed to said hub 30 and bearing guides 33 to engage the inner face of the port 26 in lower portion of liner 17. The metal of which the supplementary port is formed is of an equal thickness throughout, and being exposed to the steam on all sides naturally expands equal to agree with the shape of the movable parts of the valve, thus insuring a free but close movement of the wings 33 and the valve 31 within the port 26. The upper or flat valve 28 is obviously designed to close the upper port 25 while the lower valve 31 closes the lower port 26, and by reason of the slight independent vertical movement of the lower valve 31 provided for upon the hub 30, said valve is permitted to close slightly in advance of the upper valve 28 in a manner to prevent the cutting of the said upper valve, and also in a way to insure the opening of the upper valve in advance of the opening of the lower valve, which again saves the upper valve from wire drawing. The interior of the upper cylindrical lining 22 is bored to receive the movable piston, and is in proper alinement with the bore of port 26 of lower liner 17 so as to insure a free movement of the piston and perfect operation of the valves.

As before intimated my valve is automatically operated by the varying pressures of steam in low pressure side of the valve and by substantially the same means employed in my smaller types of regulating valves before referred to. This means in part comprises a diaphragm controlling valve 35 which is attached to the side of the body 10 and is connected through a by-pass 36 to both the high and low pressure sides of the main valve in the manner shown in Fig. 1. This particular construction for applying the controlling valve and by-pass is covered in another application and therefore a more detailed description of said feature is not thought to be necessary herein. The operation of this valve therefore is substantially like that of my before mentioned type of valve and briefly is as follows: With the valve connected up in a steam pipe line, the steam obviously enters the inlet 11 and establishes an equal pressure within the chambers 15 and 37 which are connected through the port 38 in the piston, and tend to hold the valve down upon the seat until such times as when the pressure in said chamber 37 is released. This upper chamber is connected through the pipe 36 with the pressure operated controlling valve, in a manner to be released thereby when the pressure in the lower side 39 of the service system falls below the desired point, so as to allow the initial pressure to lift the piston and its valve, thus opening first the upper port 25 and then the lower port 26 giving a direct flow of steam into the system to build up and reëstablish the pressure therein, until the diaphragm of the controlling valve operates to close the same, causing the pressure to again build up in the upper chamber and force its piston and its valve down against the seat.

Having thus described my invention what I claim and desire to secure by Letters Patent is:—

1. A regulating valve of the class described, the same comprising an inlet and an outlet chamber with a division wall therebetween having an opening therethrough, a liner of different material seated in the said opening and forming a suspended cushion chamber intermediate the two chambers with ports to both said inlet and outlet chambers, and a valve member operatively mounted within the liner to engage the seats thereof.

2. A regulating valve of the class described, the same comprising an inlet and outlet chamber with a division wall therebetween and having a threaded opening therethrough, a liner threaded to engage the said opening and forming a cushion chamber intermediate of inlet and outlet chambers with ports to each of said chambers, and a valve member mounted within the liner to engage the seats of said ports.

3. A regulating valve of the class described, the same comprising a steel body with a high and low pressure chamber separated one from the other by a divisional wall, a cover for the body having a depending annular flange extended into the body to form a liner therefor, a second liner mounted within the divisional wall and shaped to form a cushion chamber intermediate of the high and low pressure chambers with ports leading to and from said cushion chamber, a piston movably mounted within the upper liner and a pair of connected valve members to open and close the ports leading to and from the cushion chamber.

4. A regulating valve of the class described, the same comprising a high and low pressure chamber with a division wall therebetween and having an opening therethrough, a liner of different material seated in the said opening and shaped to form an upper and lower valve seat intermediate the two chambers, a connected pair of valve members operatively mounted within the liner to engage the seats thereof, a second liner of larger diameter located within the chamber above the opening, and a piston operatively mounted in the last named lining and connected to operate the valve members.

Signed at Bridgeport, in the county of Fairfield and State of Connecticut this 21st day of October, A. D. 1908.

GEORGE W. COLLIN.

Witnesses:
C. M. NEWMAN,
RUTH RAYMOND.

Copies of this patent may be obtained for five cents each, by addressing the "Commissioner of Patents, Washington, D. C."